United States Patent [19]
Faith et al.

[11] Patent Number: 4,777,645
[45] Date of Patent: Oct. 11, 1988

[54] TELEPHONE LINE TEST AND DISPLAY CIRCUIT

[75] Inventors: Richard W. Faith, Oxnard; James D. Eckman, Port Hueneme; Leonard E. Curtin, Camarillo; Chuck Muir, Oxnard, all of Calif.

[73] Assignee: Harris Corp., Melbourne, Fla.

[21] Appl. No.: 13,239

[22] Filed: Feb. 10, 1987

[51] Int. Cl.[4] ............................................. H04M 3/22
[52] U.S. Cl. ....................................... 379/31; 379/22; 379/21; 375/10; 324/78 R
[58] Field of Search .................. 379/31, 22, 1, 21, 23, 379/36; 370/14; 375/10; 324/78 R

[56] References Cited
U.S. PATENT DOCUMENTS
3,711,661 1/1973 Garett et al. ........................ 379/21

Primary Examiner—Stafford D. Schreyer
Attorney, Agent, or Firm—Antonelli, Terry & Wands

[57] ABSTRACT

A telephone line test and display circuit for enabling a craftsperson to automatically monitor a plurality of communication aspects of a telephone line without impacting any communications that may be taking place over the telephone line being monitored includes a communication capability detection and indicator unit through which the craftsperson may observe the DC operational state (busy/idle, battery polarity, talk battery present) condition of the line by observing a pair of light emitting diodes. The light emitting diodes are color-coded in accordance with operational status conditions being monitored and are illuminated in either a steady state or flashing condition, depending upon the DC state of the line. Also contained with the test and display circuit is a frequency discriminator/display unit, having a set of light emitting diodes separate from those employed for monitoring the DC operational status of the telephone line. The frequency discriminator/indicator unit monitors the line for the presence of communication signals and selectively illuminates an individual one of a set of light emitting diodes, each of which is associated with a prescribed frequency band of signals.

35 Claims, 3 Drawing Sheets

TELEPHONE LINE TEST AND DISPLAY CIRCUIT

FIELD OF THE INVENTION

The present invention relates to telephone line test circuits and is particularly directed to a circuit for testing a telephone line for a number of activity conditions and automatically providing a display of the condition(s) detected to the telephone craftsperson.

BACKGROUND OF THE INVENTION

The continued successful operation of a telephone network frequently requires on-site maintenance and diagnostic testing of a telephone line by field service technicians or craftspersons. Through experience and familiarity with long established telephone signalling characteristics, and with the aid of a variety of rudimentary test devices, the service technician has been able to electrically 'splice' into a telephone link and 'listen' to the line for telltale sounds of operational status. For example, one conventional procedure for detecting talk battery has involved the craftsperson bridging the tip and ring leads with a handset and listening for a sharp 'click' indicating the presence of the 48 volt talk battery potential. Similarly, dial pulsing and voice signally have been detected by the craftsperson simply cutting in on the line and listening for activity.

As signalling formats and bandwidth utilization have expanded over recent years, however, this conventional aural-only monitoring approach to line testing and diagnostic evaluation may not only be unsuccessful, but may interfere with the transmission to be monitored.

More particularly, telephone lines have become a major communication link for a variety of communication signals other than voice; data communications between digital signal processing equipments commonly employ telephone lines as part of their communication network. In addition, with refinements in audio/digital signal processing systems, many telephone networks presently use an all digital format regardless of the type of information to be transmitted. As a consequence, a craftsperson who splices a handset into a telephone link for monitoring/testing purposes may be faced with the problem of not only being unable to hear or communicate (where the communication form is an all digital high data rate scheme), but the transient resulting from the butt-in can be expected to effect a burst-kill of the digital data traffic.

SUMMARY OF THE INVENTION

In accordance with the present invention, there is provided a new and improved scheme for enabling a craftsperson to automatically monitor a plurality of communication aspects of a telephone link without the need for a variety of limited function, special purpose devices and without impacting any communications that may be taking place over the telephone line being monitored. To this end, the present invention is directed to a telephone line test and display circuit which includes a communication capability detection and indicator unit through which the service technician or craftsperson may observe the DC operational state (busy/idle, battery polarity, talk battery present) condition of the line by observing a pair of light emitting diodes. The light emitting diodes are color-coded in accordance with operational status condition being monitored and are illuminated in either a steady state or flashing condition depending upon the DC state of the line. The tip and ring leads of the telephone line are coupled to a comparator circuit which compares the tip-ring potential with the output of an illumination pulsating control oscillator. Depending upon the busy/idle condition of the line and the polarity of the voltage applied to the line, one or the other of the light emitting diodes will flash or be energized continuously, thus providing the craftsperson with a visual indication of the busy/idle state and the polarity of the talk battery voltage. If the tip-ring leads are shorted or opened, absent a talk battery voltage, both light emitting diodes will flash alternately. Thus, the two diodes are able to provide an indication of five identifiable DC operational parameters of the telephone link.

Also contained with the test and display apparatus of the invention is a frequency discriminator/display unit, having a set of light emitting diodes separate from those employed for monitoring the DC operational status of the telephone link. The frequency discriminator/indicator unit monitors the link for the presence of communication (AC) signals and selectively illuminates an individual one of a set of light emitting diodes, each of which is associated with a prescribed frequency band of signals, such as high frequency (digital data) communication signals (e.g. above 3.3 kHz), voice communications signals (e.g. between 300 Hz and 3.3 kHz) and low frequency signals (e.g. less than 300 Hz such as burglar alarm dial pulse type signaling).

The test apparatus and indicator unit of the present invention is powered by an internal replaceable 9 volt battery. Power for the operation of each of the circuit components of the system is controllably initiated for a prescribed period of time in response to the craftsperson activating a switch in a power supply timing control circuit. Activation of the switch causes the requisite power supply potentials to be supplied to the various circuit components of the system for a prescribed testing interval (e.g. five minutes) after which the system automatically shuts down. Its timing function serves to conserve battery power and avoid the necessity of having the craftsperson remember to turn the unit off.

DETAILED DESCRIPTION

Figure 1:
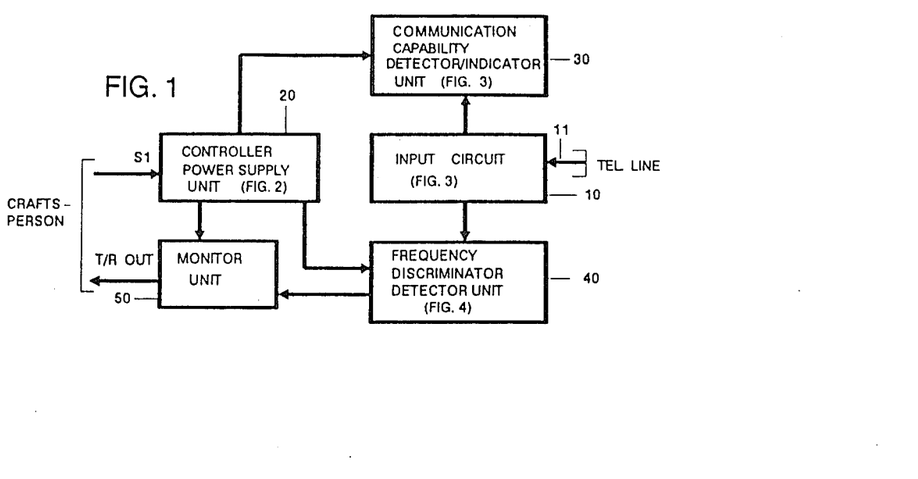
FIG. 1 is a functional block diagram illustration of the telephone line test apparatus in accordance with the present invention.

Referring now to FIG. 1, a functional block diagram of the telephone line test and indicator apparatus of the present invention is shown as comprising an input circuit 10 which is coupled a telephone link 11 and to a communication capability detector/indicator unit 30 and a frequency discriminator indicator unit 40. As will be detailed below, input circuit 10 essentially comprises connection/bias links coupled between the tip and ring portions of the telephone link 11 and communication capability detector/indicator unit 30 and frequency discriminator detector/indicator unit 40. Communication capability detector/indicator unit 30 is employed to monitor the polarity, busy/idle status and the presence of a 'talk battery' potential on telephone link 11.

Depending upon the status of each of these three monitored aspects of the telephone link, communication capability detector/indicator unit 30 selectively energizes output display elements, specifically light emitting diodes, for providing the craftsperson with an indication of these status items.

Frequency discriminator indicator unit 40 monitors the telephone link for the presence of communication signals, specifically voice signals, high frequency data communication signals, and lower frequency alarm (e.g. fire, burglar alarm) signals. Like communication capability detector/indicator unit 30, frequency discriminator unit 40 is provided with a plurality of light emitting diodes, individual ones of which are dedicated to respective frequency bands, so as to provide the craftsperson with an indication of both the presence of and the type (by virtue of frequency band) of any signals being transmitted over the telephone link being monitored.

Power for the operation of the telephone test and indicator apparatus of the present invention is supplied by a controlled power supply unit 20, which is coupled to each of communication capability detector/indicator unit 30 and frequency discriminator indicator unit 40, as well as an additional aural monitor unit 50. Controlled power supply unit 20 is selectively enabled in response to the momentary closure of an enabling switch by the craftsperson, which causes operational power for each of the functional units of the apparatus to be supplied from an internal battery for a prescribed period of time sufficient to permit the craftsperson to use the test and indicator apparatus of the present invention for testing the telephone line. Controlled power supply unit 20 also supplies power to aural monitor unit 50, so that the craftsperson may listen to the activity (e.g. voice and signalling traffic) over the telephone link 11, as required during testing.

Figure 2A:
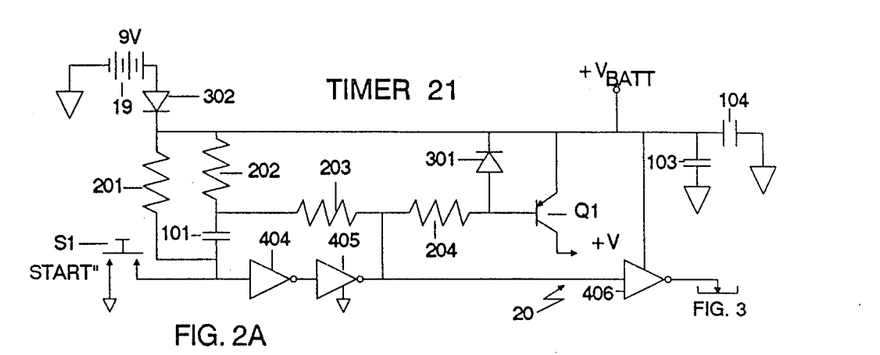
FIGS. 2A and 2B are a detailed schematic illustration of the internal circuitry configuration of controlled power supply unit 20 of FIG. 1.
Figure 2B:
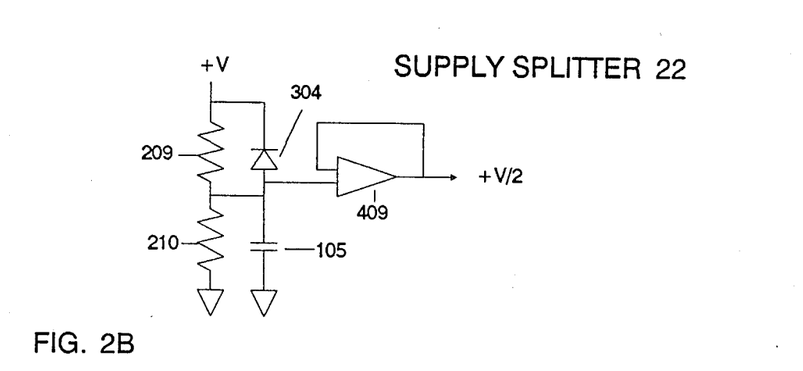
Figure 3:
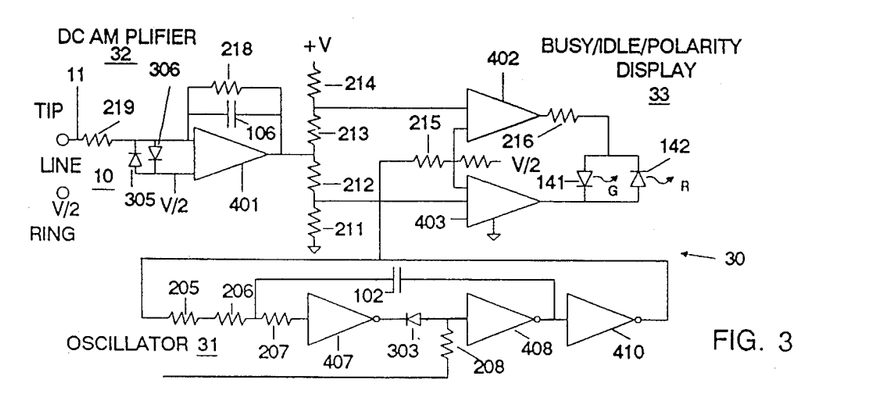
FIG. 3 is a detailed circuit schematic diagram of the circuitry configuration of communication capability detector/indicator unit 30 of FIG. 1.

Referring now to FIGS. 2A, 2B and 3, there is shown a detailed schematic illustration of input circuit 10, communication capability detector/indicator unit 30 and controlled power supply on unit 20.

As pointed out previously, the telephone line test and display apparatus of the present invention is powered by an internal (9 volt) battery. In order to insure that power is conserved, the controlled power supply unit 20 is configured to power-up each of the units of the system when enabled by the craftsperson and then to subsequently automatically power down the system after a prescribed period of time. This automatic powering down or turning off of each of the units relieves the craftsperson of the need to remember to turn the apparatus off after a telephone line has been tested.

As shown in FIGS. 2A and 2B, the controlled power supply unit 20 includes a timer section 21 and a power supply splitter section 22. Timer section 21 is controllably enabled by the momentary depression of a start switch S1 and causes power from an internal 9 volt battery 19 to be supplied to each of the functional units of the apparatus for a prescribed period of time (the above-mentioned 5 minute interval) and thereafter cut-off. Power supply splitter section 22 comprises a power divider amplifier unit which divides the voltage generated from the timer section 21 into the appropriate levels for operation of the various circuitry components of the apparatus.

Looking now at the circuitry configuration of timer section 21, an internal portable (9 volt) battery 19 is coupled between ground and the anode of diode 302, the cathode of which is coupled to a timing circuit comprising series connected charging resistor 202 and capacitor 101 and a discharge resistor 201 coupled across the series connection of resistor 202 and capacitor 101. Diode 302 is also coupled to the cathode of a diode 301 and to the emitter of a PNP transistor Q1. The connection of the cathode of diode 302 and the emitter of transistor of Q1 is also coupled to a battery terminal $+V_{BATT}$ and through a pair of bypass capacitors 103 and 104 to ground.

The base of PNP transistor Q1 is coupled to the anode of diode 301 and through a series connection of resistors 203 and 204 to the common connection of resistor 202 and capacitor 101. The junction of resistors 203 and 204 is coupled to the output of a pair of cascaded inverting amplifiers 404 and 405. The input of amplifier 404 is coupled to the connection of resistor 201 and capacitor 101 and to one terminal of a start switch S1. A second terminal of start switch S1 is coupled to ground, as shown. When depressed, start S1 momentarily places a ground (low) level signal at the input of amplifier 404 and to one side of capacitor 101. The output of amplifier 405 is coupled to the input of downstream inverting amplifier 406, the output of which is coupled to communication capability detector/indicator unit 30 (to be described below with reference to FIG. 3).

The collector of transistor Q1 is coupled to a voltage divider circuit comprised of equal valued, series-connected resistors 209 and 210 in the power supply splitter section 22 of controlled power supply unit 40. The junction of resistors 209 and 210 is coupled to the anode of diode 304 and to one side of capacitor 105. The other side of capacitor 105 and the opposite side of resistor 210 are coupled to ground. The cathode of diode 304 is coupled to the +V side of resistor 209 derived from the collector of transistor Q1. The junction of resistors 209 and 210 is further coupled to an amplifier 409, at the output of which half the power supply voltage (i.e. $+V/2$) is provided.

In its quiescent state, with start switch S1 not being depressed, so that there is an open circuit between the two terminals thereof, capacitor 101 will have been discharged through resistor 202 and resistor 201. As a result, the input of inverter amplifier 404 sees the high positive voltage supplied from the positive terminal of (+9V) internal battery 19 through diode 302 and resistor 201. Amplifier 405 inverts the low output from inverter amplifier 404 to a high voltage value, which is coupled through resistor 204 to the base of PNP transistor Q1, so that transistor Q1, which effectively corresponds to a master power switch of the controlled power supply unit, is turned off. In addition, amplifier 406, being driven by the high output of amplifier 405, provides a low output voltage to inhibit activity in the communication capability detector/indicator unit 30.

When the craftsperson desires to enable the controlled power supply unit and thereby cause the test and indicator apparatus of the present invention to be powered up, he depresses switch S1, so that the side of capacitor 101 which is connected to input of amplifier 404 is coupled to ground through the switch S1. The value of charging resistor 202 is relatively low (e.g. 10 kilohms) compared with that (e.g. 10 megohms) of discharging resistor 201, so that capacitor 101 becomes charged through the charging path of diode 302, resistor 202 and th ground connection through switch S1. Thus, with switch S1 being depressed and momentarily held, capacitor 101 is rapidly charged, with resistor 202 acting to limit the charging current. Also, since switch S1 is temporarily closed, the output of amplifier 405 will be in a low state, thereby turning on transistor Q1 through resistor 204 and causing the output of amplifier 406 to go high. With transistor Q1 being turned-on, the desired power supply voltage +V is coupled through its emitter-collector path to the circuitry of each of the units of the apparatus, and to power supply splitter section 22.

Within power supply splitter section 22, the voltage divider network comprised of resistors 209 and 210 splits the voltage at the junction of the resistors, since each resistor is of the same value. Amplifier 409 supplies requisite current boost at its output to supply an output voltage +V/2 to the remainder of the circuitry of the apparatus.

When the start switch S1 is released, thereby removing ground from the lower terminal of capacitor 101, capacitor 101 begins to discharge through charging current control resistor 202 and discharge resistor 201. As noted above, resistor 201 is a relatively larged-value resistor (e.g. on the order of 10 megohms), so that the RC time constant of resistor 201 and capacitor 101 (value of 47 F) may be on the order of several minutes (e.g. 5 minutes). Since resistor 201 constitutes the only mechanism for discharging capacitor 101, the logic states that the outputs of amplifiers 404, 405 and 406 remain unchanged after switch S1 is released (opened) throughout the discharging period required for capacitor 101 to discharge to approximately 50% (e.g. five minutes). As the voltage provided to amplifier 404 by capacitor 101 crosses its logic threshold, a rapid change of state begins to occur at the output of amplifier 404 and, also, at the output of amplifier 405. Since a fraction of a resulting rising transition is fed back through capacitor 101 to the input of amplifier 404 by the voltage divider network consisting of resistors 202 and 203, the transition is forced to occur very quickly, thereby insuring a well-defined turn off. The rising transition at the output of amplifier 405 thus reestablishes the "off" state of the power supply control unit (and thereby the respective units of the apparatus) for turning off transistor Q1 and causing the output of amplifier 406 to return to its low state. Diode 301 protects the base of transistor Q1 against transient reverse voltages, while capacitors 103 and 104 provide power supply bypassing to ground, as noted above. Diode 302 protects the unit against damage that might be caused by incorrect insertion of the battery (reversed battery polarity).

As noted above, power supply splitter section 22 supplies a voltage that is accurately one-half the power supply voltage at the collector of transistor Q1 with a low AC impedance. This half supply voltage +V/2 is derived from the full supply voltage by the voltage divider consisting of equal-valued resistors 209 and 210. Capacitor 105 provides bypassing to ground so that the output has a low ripple content with respect to ground. Amplifier 409 preferably comprises an FET-input operational amplifier configured as a voltage follower, providing the low AC output impedance. Since the supply voltage from the voltage divider supplied to amplifier 409 is switched by the timer section 401 and could conceiveably decay faster than the voltage cross capacitor 105 during shut down, diode 304 is coupled between the +V input and capacitor C5 to protect the non-inverting input of amplifier 409 against damage by transient voltages.

Communication Capability Detector/Indicator Unit 30 (FIG. 3)

Referring now to FIG. 3, there is shown a detailed circuit schematic illustration of the internal configuration of communication capability detector/indicator unit 30. As shown therein, this unit comprises an oscillator 31, a DC amplifier 32 and a busy/idle/polarity display unit 33. Oscillator 31 is enabled by the timing section 21 of controlled power supply unit 20 and supplies a low-frequency square wave signal which is employed to control the flashing of light emitting diodes contained within the busy/idle/polarity display unit 33. Amplifier 32 is coupled between the tip coupling terminal of the input unit 10 and inputs to a comparator section of busy/idle/polarity display unit 33.

Oscillator 31

As shown in FIG. 3, oscillator 31 is a relaxation oscillator comprising three series-coupled inverters 407, 408 and 410 with an additional gating diode 303 and resistor 208 for forcing the oscillator into an essentially zero-power inactive mode with its operation is not needed (the test/indicator apparatus is turned off).

Inverting amplifier 407 is coupled at its output to the cathode of diode 303, the anode of which is coupled through resistor 208 to the output of inverting amplifier 406 of timing section 21, referenced above. Resistor 208 is also coupled to the input of amplifier 408, the output of which is coupled through capacitor 102 to the junction of resistors 206 and 207. Resistor 207 is coupled to the input of amplifier 407, while resistor 206 is coupled through resistor 205 to the output of amplifier 410, the input of which is coupled to the output of amplifier 408. The output of amplifier 410 is coupled through resistor 215 to busy/idle/polarity display circuit 33.

When turned-on by the coupling of a high voltage level at the output of amplifier 406 in timer section 21 to the input of resistor 208, the output of inverter 408 goes low, so that the output of inverter 410 goes high. The falling transition at the output of inverter 408 causes the junction of capacitor 102, resistor 206 and resistor 207 to be momentarily brought below the negative supply potential of amplifier 407. As a result, resistor 207 is provided in order to limit the transient input current. The high state at the output of amplifier 410 pulls up capacitor 102 through resistors 205 and 206 until the input of amplifier 407 has reached its logic threshold of approximately one-half the supply voltage +V. At that time, the output of inverter 407 drops, causing the output of amplifier 408 to go high and, in turn, causing the output of amplifier 410 to fall. The increase in the output of amplifier 408 is coupled to the input of amplifier 407 through capacitor 102, causing the voltage at the junction of capacitor 102 and resistors 206 and 207 to momentarily exceed the positive supply potential of amplifier 407, and once again bring into play the current-limiting function of resistor 207. Capacitor 102 is now pulled down through resistor 205 and 206 until the input of inverter 407 drops below its logic threshold. The resulting increase in the output of inverter 407 completes the cycle, which would repeat indefinitely except for the time out function of timing section 21, discussed above. Namely, once the timing section 21 of the controlled power supply unit 20 times out, the input to resistor 208 goes low, turning off the oscillator 31. When oscillator 31 is in its off condition, the output of amplifier 407 is high, the output of amplifier 408 is high and the output of amplifier 410 is low. Since diode 303 is reversed-biased in the off condition, oscillator 31 consumes virtually no power because only device leakage currents continue to flow.

DC Amplifier 32

DC amplifier 32 is coupled between the tip terminal of input coupling section 10 and busy/idle/polarity display unit 33 and serves to provide an output voltage which is a linear function of the DC voltage across the tip and ring leads for all tip-to-ring voltages between approximately −40 volts and about +40 volts. Since the test and display apparatus of the present invention operates on a single 9-volt power supply battery, as noted above, the gain of DC amplifier 32 must be fractional in order to provide linearity over the input range. A further purpose of DC amplifier 32 is to isolate the telephone line from the loading effect of other circuitry.

Amplifier 32 is configured from a single inverter section 401, having input resistor 219 and feedback resistor 218. Capacitor 106 reduces the AC gain of the circuit, as necessary, without affecting DC gain. Diodes 303 and 305, which are coupled from resistor 219 to bias input terminal +V/2, protect the inverting input of amplifier 401 against excessive voltages of either polarity.

Busy/Idle/Polarity Display Circuit 33

Busy/idle/polarity display circuit 33 is comprised of a pair of amplifiers 402 and 403 which are coupled through a voltage divider network to the output of DC amplifier unit 32 and to the output of oscillator circuit 31. The outputs of comparators 402 and 403 are coupled to respective light emitting diodes (display elements) 141 and 142 for providing a controlled display indicative of the communication capability (namely the busy/idle status, battery polarity and talk battery presence status) of the telephone line being monitored.

More particularly, comparator 402 has its inverting input coupled to the junction of resistors 214 and 213 of the above-mentioned voltage divider network. Conversely, the noninverting input terminal of comparator 403 is coupled to the junction of resistors 212 and 211. The output of amplifier 401 of DC amplifier circuit 32 is coupled to the junction of resistors 213 and 212. The noninverting input of comparator 402 and the inverting input of comparator 403 are coupled through resistor 215 to the output of oscillator circuit 31, as noted previously. The output of comparator 402 is coupled through resistor 217 to the anode of light emitting diode 141 and the cathode of light emitting diode 142. The cathode of light emitting diode 141 and the anode of light emitting diode 142 are coupled to the output of comparator 403. For purposes of the present description, it will be assumed that each of light emitting diodes 141 and 142 emits a respectively different colored light output (e.g. diode 141 is a green emitting diode while diode 142 is a red emitting diode).

In operation, the output of DC amplifier 32 is coupled to the two respective voltage divider sections (resistors 213–214 and resistors 211–212) at the input of comparators 402 and 403. The outputs of these two voltage dividers supply input voltages to the two respective comparators with the alternative inputs of the two comparators 402 and 403 being driven by a fraction of the output of the oscillator circuit 31 as established by a voltage divider consisting of resistors 215 and 216. Namely, the voltage divider comprising resistors 215 and 216 applies to the non-inverting input of comparator 402 and to the inverting input of comparator 403 a rectangular waveform provided by oscillator 31 which oscillates symmetrically about one-half the supply voltage (+V/2). At the same time, the voltage divider section comprising resistors 211 and 212 supplies to the non-inverting input of comparator 403 a voltage which is a fraction of the output of DC amplifier circuit 32, while the voltage divider comprising resistors 213 and 214 supplies to the inverting input of comparator 402 a voltage which is a prescribed fraction of the output of DC amplifier circuit 32.

The values of the voltage divider resistors 211–214 are such that the following sets of relationships occur:

1—Talk Battery Absent.

When the differential tip-to-ring voltage applied the input of DC amplifier 32 is near zero, each of comparators 402 and 403 will switch in synchronism with the rectangular wave output of oscillator 31, but will be offset in phase with respect to one another by 180°. As a result, comparators 402 and 403 will alternately energize light emitting diodes 141 and 142, so that an alternating red/green display will be provided by light emitting diodes 141 and 142. Namely, when the tip-to-voltage is near zero, indicating the lack of a talk battery, the craftsperson will observe an alternating red and green flashing signal from light emitting diodes 141 and 142.

2—Busy line/normal polarity.

If the telephone line is busy and the battery connection is of normal polarity, the tip lead will be positive with respective to the ring lead (typically by an amount between +1.7 volts and +39 volts). As a result, the output of comparator 402 will change state in synchronism with the output of oscillator 31, thereby causing light emitting diode 141 to produce a flashing green display signal. The output of comparator 403 will remain continuously low, on the other hand, so that light emitting diode 142 is not enabled.

3—Busy line/reverse polarity.

When the tip lead is negative with respect to the ring lead (e.g. by a magnitude ranging between the above-mentioned value of 1.7 and −39 volts) the output of comparator 403 will be switched by the output of oscillator 31, but out of phase with the output of oscillator 31, thereby causing light emitting diode 142 to produce a red flashing signal indicating a busy line of reversed polarity. Comparator 402 will remain continuously low, so that light emitting diode 141 is not energized.

4—Idle line/normal polarity.

When the tip lead is positive with respect to the ring lead by at least +39 volts, the output of comparator 402 remains continuously high, while the output of comparator 403 remains continuously low. Since the output of comparator 403 is continuously low, light emitting diode 142 is not energized. Because comparator 402 produces a continuously high output, light emitting diode 141 is continuously forward-biased, so that a continuous green display is provided, indicating an idle line of normal polarity.

5—Idle line/reverse polarity.

When the tip lead is negative with respect to the ring lead by a minimum of about 39 volts, the output of comparator 402 remains continuously low, while the output of comparator 403 remains continuously high. As a result, green light emitting diode 141 is continuously disabled, while red light emitting diode 142 is continuously enabled, thereby producing a continuously red display that indicates an idle line of reversed polarity.

Thus, by using only two differently colored light emitting diodes, the communication capability detector indicator unit 30 is capable of providing comprehensible visual information about the DC parameters of the telephone line. Their visual indications may be tabulated as follows:

Steady green: straight polarity, idle,
Flashing green: straight polarity, busy,
Alternating red and green: open or shorted line (talk battery absent),
Flashing red: reversed polarity, busy,
Steady red: reversed polarity, idle.

Alternatively, the conditions of the display light emitting diodes may be identified as:

Steady: idle,
Flashing: busy,
Alternating: talk battery absent,
Red: reversed polarity,
Green: normal polarity.

Figure 4:
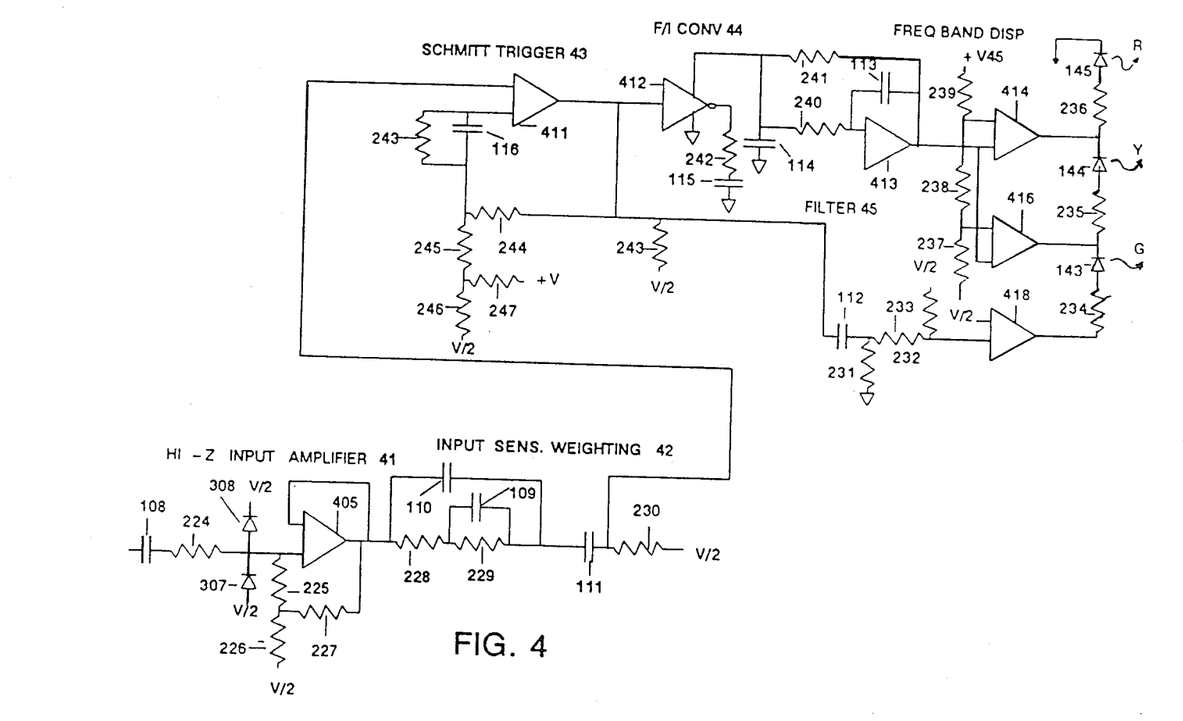
FIG. 4 is a detailed circuit schematic illustration of the internal circuitry configuration of frequency discriminator indicator/indicator unit 40 of FIG. 1.

Frequency Discriminator Indicator Unit 40 (FIG. 4).

Referring now to FIG. 4 there is illustrated a detailed schematic circuit diagram of the configuration of the frequency discriminator indicator unit 40. Specifically, the frequency discriminator indicator unit comprises a high input impedance buffer amplifier 41 coupled to the tip lead of the telephone line. The output of amplifier 41 is coupled through an input sensitivity weighting network 42 to a Schmitt trigger unit 43. The output of Schmitt trigger unit 43 is coupled through a frequency/current converter 44 and low pass active filter 45 to comparators 414 and 416 of a comparator section 46. The output of Schmitt trigger circuit 43 is coupled to comparator 418 of comparator section 46. These individual sections of the frequency discriminator indicator unit 40 and the overall operation of the unit are detailed below.

High Input Impedance Buffer Amplifier 41

High impedance input buffer amplifier 41 comprises an input DC blocking capacitor 108 coupled to the tip lead terminal of input circuit 10 and a resistor 224 of an overvoltage protection network which also comprises reverse-connected diodes 307 and 308 which are coupled between the junction of resistor 224 and the input of inverter 405 and bias terminal +V/2. As long as the amplitude of the signal on the tip lead does not exceed approximately one volt, peak-to-peak, diodes 307 and 308 have little effect, behaving essentially as an open circuit. In the event of an undesirably high signal amplitude, diodes 307 and 308 clamp the signal applied to amplifier 410, so that the signal cannot deviate from half the supply potential by more than one diode drop. Large transient voltages are thereby dissipated primarily across resistor 224.

Amplifier 405 may comprise an FET input operational amplifier configured as a voltage follower, similar to amplifier 409 in power supply splitter section 22 of controlled power supply unit 20, described above. A bias network comprising resistors 225, 226 and 227 is coupled across amplifier 405, as shown. Resistor 225 constitutes a DC input return resistor which is coupled to a voltage divider comprising resistors 226 and 227 connected between the output amplifier 405 and bias supply (+V/2). Since resistor 225 is connected to the voltage divider, rather than directly to half the supply voltage (+V/2), resistor 225 carries only a fraction of the signal AC signal current as it would carry if it were directly connected to half the supply voltage bias (+V/2). As a result, the amplifier AC input impedance is extremely high, even for low frequencies all the way down to approximately 1 Hz. Because of the extremely high input impedance provided by amplifier 41, connecting the frequency discriminator indicator unit to the telephone line does not place a load on the line and therefore does not affect any signalling on the telephone line. This is an especially important aspect of the present invention in connection with the monitoring of data communication signals, in which any transient, resulting from the connection of a monitoring device to the line, would effectively destroy data being transmitted during the transient.

Input Sensitivity Weighting Network 42

Input sensitivity weighting network 42 comprises resistors 228, 229, 230 and capacitors 109, 110 and 111, as shown. This network attenuates low-frequency signals so that, in order to overcome the threshold of a downstream Schmitt trigger unit 43, such low frequency signals must exist at larger amplitudes than are required for high frequency signals. As a result, communication signals generated by the frequency discriminator indicator unit are effectively prioritized in favor the high frequency data communication signals, followed by voice communication signals and lastly by the low frequency alarm signals.

Schmitt Trigger Circuit 43

Schmitt trigger circuit 43 comprises a comparator 411, resistors 243-248 and a capacitor 116. The output of input sensitivity weighting circuit 42 is coupled to the inverting input of comparator 411, while the noninverting input is coupled through the resistor-capacitor network to power supply voltages (+V) and (+V/2).

When the output transistor within the comparator 411 is on, the output of the comparator drops to nearly ground potential. When the comparator output is in its off (high) state resistor 248 pulls the output up to nearly half the supply voltage potential (+V/2). As a result, the output voltage swing of comparator 411 is established at half the supply voltage (+V/2), peak-to-peak, in order to ensure proper operation of a downstream frequency-to-current converter unit 44.

The voltage divider comprising resistors 244-246 feeds back a prescribed fraction of the comparator output swing to the noninverting input, so as to establish a prescribed difference between the positive going-threshold and the negative-going threshold of the Schmitt trigger circuit 43. An additional resistor 247 is employed to bias these two thresholds symmetrically about the half supply voltage level (+V/2). Resistor 243 provides matching of the net circuit resistances looking into the two comparator inputs, so that the tendency of the comparator input bias current to offset the thresholds is maintained at a tolerable magnitude. Bypass capacitor 116 counteracts the tendency of resistor 243 to sensitize the comparator to stray pickups.

Frequency-current Converter 44

Frequency-current converter 44 comprises an inverter 412 (such as a CMOS hex-inverter) which inverts the output of the Schmitt trigger unit 43 and drives an output load consisting of a series connection of a resistor 242 and capacitor 115. The value of resistor 242 is selected at a sufficiently low value to insure that capacitor 115, at all frequencies up to at least the lower frequency of the data communication signals of interest, is fully charged and fully discharged during each cycle of the rectangular wave coupled through the Schmitt trigger circuit 43, but high enough to avoid excessive peak output and supply currents in inverter 412. Inverter 412 draws a 'supply' current that is very linear with respect to frequency, in accordance with the relationship I=CEF, where I is the sink current, C is the the sum of the capacitance of capacitor 115 and the small parasitic apacitance hex-inverter 412, E is the DC supply voltage (+V/2) and F is the frequency of the input signal in Hz.

Low-Pass Active Filter 45

Low-pass active filter 45 serves to provide inverter 412 with a supply voltage that is essentially eqi potential to half the supply voltage (+V/2). It also maintains a low ripple-voltage at the supply terminals of hex-inverter 412 and provides a DC output voltage that is equal to the sum of half the supply (+V/2) and the product of resistor 241 and the sink current of inverter 412. Finally, filter 45 maintains an adequately low ripple-voltage content of the output voltage.

Low-pass active filter 45 is configured of an integrator consisting of inverter 413, input resistor 240 and feedback capacitor 113. The integrator operates essentially as an infinite-gain DC amplifier providing at the output of amplifier 413, to which output resistor 241 from frequency-current converter 44 is connected, whatever DC voltage is required in order to maintain the voltage at inverter 412 at half the supply voltage. Since the only significant DC current path to this point is the positive supply terminal of inverter 412, the voltage drop across resistor 241 is essentially equal to the product of the supply current of inverter 412 and the value of resistor 241. Since the D.C. current (and hence the D.C. voltage drop) through input resistor 240 is essentially equal to zero, the output D.C. voltage to a positive supply terminal of inverter 412 is equal to half the supply voltage (+V/2). Capacitor 114 supplies the low AC impedance required to keep the ripple content of the supply voltage to amplifier 412 adequately low.

Comparator Display Section 46

The output of low-pass active filter 45 (the output terminal of amplifier 413) is coupled to the noninverting inputs of a pair of comparators 414 and 416 of comparator display section 46. The inverting inputs of comparators 414 and 416 are coupled to a voltage divider consisting of resistors 237-239, successively coupled in series between +V/2 and +V, as shown. The output of comparator 414 is coupled through resistor 236 to the anode of light emitting diode 145, the cathode of which is coupled to ground. The output of comparator 416 is coupled through resistor 235 to the anode of light emitting diode 144, the cathode of which is coupled to the junction of the output of comparator 414 and resistor 236. For purposes of the present description, it will be assumed that light emitting diode 144 is amber colored, while light emitting diode 145 is red.

Comparator display section 46 further includes an additional comparator 418, the inverting input of which is coupled to half the supply voltage (+V/2) and the noninverting input of which is coupled to a voltage divider network comprising resistors 231-233. The input of comparator 418 is coupled through the voltage divider network and capacitor 112 to the output of Schmitt trigger circuit 43. The output of comparator 418 is coupled through resistor 234 to the anode of light emitting diode 143, the cathode of which is coupled to the junction of the output of comparator 416 and resistor 235. Light emitting diode 143 may assumed to emit a green colored light.

In the absence of input signals to any of the comparators 414-418, the voltage divider at the input of comparator 418, comprising resistors 231-233, maintains the non-inverting input of comparator 418 sufficiently below half the supply potential (applied to the inverting input) to insure that the output state of comparator 418 is low. However, if an AC signal is present at the output of Schmitt trigger circuit 43, the non-inverting input of comparator 418 is brought to half the supply potential once during each cycle through DC blocking capacitor 112. As a result, positive pulses at the signal frequency will be produced at the output of comparator 418 and applied to the anode of light emitting diode 143.

At the same time, the frequency-dependent DC voltage from frequency converter 44, at the output of low-pass filter 45, is compared against two voltages references established by the voltage divider network comprising resistors 237-239, by the action of comparators 414 and 416. These voltage references are such that comparator 416 goes high for all signal frequencies above 300 Hz while the output of comparator 414 goes high for all signals above approximately 3.3 kHz. Thus, for signal frequencies less than approximately 300 Hz, signal-frequency pulses from the output of comparator 418 apply a positive bias to the anode of light emitting diode 143 so as to cause light emitting diode 143 to be energized. Namely, the emission of a green optical output indicates that low frequency band signals (e.g. less than 300 Hz) are being transmitted over the telephone link.

For voice signals (e.g. in a band between 300 Hz and 3.3 kHz) the output of comparator 416 goes high, to prevent light emitting diode 143 from being energized by the application of a positive voltage to its anode from the output of comparator 418. With the output of comparator 414 being low, amber light emitting diode 144 is energized to indicate that voice signals are being transmitted over the telephone link.

For data communication signals (e.g. signals above 3.3 kHz) the output of comparator 44 goes high, thereby preventing the output of comparator 416 from forward biasing light emitting diode 144. Since the cathode of light emitting diode 145 is connected to ground, the high output of comparator 414 causes red light emitting diode 145 to be energized.

Overall Operation of Frequency Discriminator/Display Unit

With the input terminals of the frequency discriminator/indicator unit being coupled to the tip and ring leads of the input circuit 10, as shown, incoming signals at the tip and ring terminals will be buffered by high impedance input amplifier 41 and then weighted by network 42 so as to provide the appropriate sensitivity to all frequencies of interest prior to being supplied to downstream frequency discrimination and display circuitry. The AC signals are then coupled to Schmitt trigger circuit 43 which converts the AC waveforms into a rectangular input waveform for application to frequency-converter circuit 44 and comparator 418. Depending upon the frequency of the AC signal being monitored, only one of respective light emitting diodes 143, 144 and 145 will be energized. If the frequency of the AC signal is below approximately 300 Hz, only the green light emitting diode 143 will be energized, since the output of comparator 418 will be high while the outputs of comparators 416 and 414 will below.

If the AC signal has a frequency in a band between approximately 300 Hz and 3.3 kHz, the output of comparator 416 will go high. Even if the output of comparator 418 is high, light emitting diode 43 will not be forward biased, so that only the amber light emitting diode 144 will be illuminated.

If the frequencies of the signals being monitored lie in the data communications frequency band (above approximately 3.3 kHz) the outputs of comparators 414 and 416 will go high, thereby preventing diodes 143 and 144 from being forward biased, so that these diodes are extinguished. Instead, red light emitting diode 145 is energized to indicate the presence of high frequency data communications over the telephone link.

In addition to providing an indication of the communication capability of the telephone line and indication of the frequency band of any communication signals being transmitted over the line, the test and indicator apparatus of the present invention may also include a monitor amplifier to provide the craftsperson with the capability of coupling the unit to drive an ear phone or handset for aural monitoring. Such a monitor amplifier unit, indicated at 50 in FIG. 1, may comprise any suitable linear audio amplifier with its input terminal coupled to the outptt of high input impedance amplifier 41 and with its output terminal coupled to tip and ring monitoring terminals that in turn may be coupled to the craftsperson's earphone or headset. Because such a monitor amplifier is coupled to the output of high input impedance amplifier section 41, the craftsperson is able to aurally monitor the signals transmitted over the telephone line without placing a load on the line and thereby possibly impacting the communication signals being monitored.

As will be appreciated from the foregoing description, the test/display apparatus of the present invention provides the telephone craftsperson with a compact monitor/display device through which the craftsperson may be provided with an indication of prescribed characteristics and communication activity of a telephone link. Simply by connecting the unit to the tip and ring leads of the telephone link to be monitored and then momentarily depressing an enabling switch (start button) the craftsperson is able to monitor both the DC operating characteristics of the link and the frequency band of communication signals that may be transmitted over the link.

Through the communication capability detector/indicator unit, a pair of (red and green) light emitting diodes provide a display to the craftsperson indicating the presence or absence of talk battery, whether the line is busy or idle, and the polarity of the tip-ring potential.

Through the red, green and amber light emitting diodes of the frequency discriminator/indicator unit, the craftsperson is provided with a display of the band frequencies being employed for communication signalling. As pointed out previously, this communication monitoring aspect of the invention is particularly significant in connection with the testing of telephone links that employ digital encoding of all communications signals, including voice, which may be aurally imperceptible to the hearing range of the craftsperson.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. A telephone line test apparatus comprising;
    first means, to which a telephone line is to be coupled, for providing an output representative of an electrical condition of said telephone line;
    second means, coupled to said first means, for generating an indication of the presence of a prescribed communication capability of said telephone line; and
    third means, coupled to said first means, for monitoring said telephone line for the presence of communication signals and generating a respective indication of a prescribed frequency band in which communication signals detected thereby are contained.

2. A telephone line test apparatus according to claim 1, wherein said second means comprises means for generating an indication of the busy or idle condition of said telephone line.

3. A telephone line test apparatus according to claim 1, wherein said second means comprises means for generating an indication of the polarity of the potential of said telephone line.

4. A telephone line test apparatus according to claim 1, wherein said second means comprises means for generating an indication of the presence of a talk battery potential on said telephone line.

5. A telephone line test apparatus according to claim 2, wherein said second means further includes means for generating an indication of the polarity of the potential of said telephone line.

6. A telephone line test apparatus according to claim 2, wherein said second means further includes means for generating an indication of the presence of talk battery potential on said telephone line.

7. A telephone line test apparatus according to claim 3, wherein said second means further includes means for generating an indication of the presence of a talk battery potential on said telephone line.

8. A telephone line test apparatus according to claim 7, wherein said second means further includes means for generating an indication of the idle or busy condition of said telephone line.

9. A telephone line test apparatus according to claim 1, wherein said third means comprises means for monitoring said telephone line for the presence of communication signals in any of a plurality of prescribed frequency bands and generating a respective indication of one of the frequency bands in which detected communications signals are contained.

10. A telephone line test apparatus according to claim 9, wherein said plurality of frequency bands include a first frequency band associated with data communication signals, a second frequency band associated with voice signals and a third frequency band associated with alarm condition signals.

11. A telephone line test apparatus according to claim 1, further including fourth means, coupled to said first, second and third means, for controllably coupling operating power thereto.

12. A telephone line test apparatus according to claim 11, wherein said fourth means includes controlled switching means coupled between a power supply input and an operating power output, for causing operating power to be coupled to said first, second and third means for a prescribed period of time.

13. A telephone line test apparatus according to claim 12, wherein said controlled switching means includes means for causing said operating power to be supplied to said first, second and third means in response to a first prescribed input thereto and for causing said operating power to be decoupled from first, second and third means in response the lapse of a prescribed period of time subsequent to a second prescribed input to said controlled switching means.

14. A telephone line test apparatus according to claim 1, wherein said second means comprises means for selectively generating a plurality of display signals respectively associated with respective communication capabilities of said telephone line.

15. A telephone line test apparatus according to claim 14, wherein said second means comprises first and second display devices the energization of which provides first and second respectively different visual indications and means, coupled to said first means, for selectively energizing said first and second display devices in accordance with the detected communication capability of said telephone line.

16. A telephone line test apparatus according to claim 15, wherein said selectively energizing means comprises means for energizing said first display device in accordance with a first control characteristic in response to detecting that said telephone line possesses a first prescribed communication capability and for energizing said first display device in accordance with a second control characteristic in response to detecting said telephone line to possess a second prescribed communication capability.

17. A telephone line test apparatus according to claim 16, wherein said first control characteristic is an effectively continuous energization of said first display device, while said second control characteristic is an intermittent energization of said first display device.

18. A telephone line test apparatus according to claim 16, wherein said selectively energizing means comprises means for energizing said second display device in accordance with said first control characteristic in response to detecting that said telephone line possesses a third prescribed communication capability and for energizing said second display device in accordance with said second control characteristic in response to detecting that said telephone line possesses a fourth prescribed communication capability.

19. A telephone line test apparatus according to claim 18, wherein said first control characteristic is an effectively continuous energization of a display device, while said second control characteristic is an intermittent energization of a display device.

20. A telephone line test apparatus according to claim 18, wherein said selectively energizing means comprises means for energizing each of said first and second display devices in accordance with a third control characteristic in response to detecting that said telephone line possesses a fifth prescribed communication capability.

21. A telephone line test apparatus according to claim 15, wherein said selectively energizing means comprises an oscillator and first and second comparator circuits, each comparator circuit having a first input thereof coupled to the output of said oscillator circuit, a second output coupled to said first means and an output coupled to a respective one of said first and second display devices.

22. A telephone line test apparatus according to claim 9, wherein said second means comprises means for selectively generating a plurality of display signals respectively associated with respective communication capabilities of said telephone line.

23. A telephone line test apparatus according to claim 22, wherein said second means comprises first and second display devices the energization of which provides first and second respectively different visual indications and means, coupled to said first means, for selectively energizing said first and second display devices in accordance with the detected communication capability of said telephone line.

24. A telephone line test apparatus according to claim 22, further including fourth means, coupled to said first, second and third means, for controllably coupling operating power thereto.

25. A telephone line test apparatus according to claim 1, wherein said third means includes means for monitoring said telephone line for the presence of communication signals without effectively impacting the quality of said communications signals.

26. A telephone line test apparatus according to claim 25, wherein said third means includes means for monitoring said telephone line for the presence of communication signals through a high impedance buffer circuit that effectively prevents said third means from appearing to said telephone line as an electrical load.

27. A telephone line test apparatus according to claim 26, wherein said third means comprises means for monitoring said telephone line for the presence of communication signals in any of a plurality of prescribed frequency bands and generating a respective indication of one of the frequency bands in which detected communications signals are contained.

28. A telephone line test apparatus according to claim 27, wherein said third means comprises means, coupled between said high impedance buffer circuit and said respective indication generation means, for converting the monitored communication signals to a signal level representative of the frequency thereof and wherein said respective indication generation mans comprises comparator means for comparing said frequency representative signal level with respective levels associated with said prescribed frequency bands and generating an indication of one of said frequency bands in which detected communication signals are contained.

29. A telephone line test apparatus comprising:
first means, to which a telephone line is to be coupled, for providing an output representative of an electrical condition of said telephone line; and
second means, coupled to said first means, for monitoring said telephone line for the presence of communication signals and generating a respective indication of a prescribed frequency band in which communication signals detected thereby are contained, without effectively impacting the quality of said communication signals.

30. A telephone line test apparatus according to claim 29, wherein said second means includes means for coupling said first means to said second means through a high impedance buffer circuit that effectively prevents said second means from appearing to said telephone line as an electrical load.

31. A telephone line test apparatus according to claim 30, wherein said second means comprises means for monitoring said telephone line for the presence of communication signals in any of a plurality of prescribed frequency bands and generating a respective indication of one of the frequency bands in which detected communications signals are contained.

32. A telephone line test apparatus according to claim 31, wherein said second means comprises means includes means, coupled between said high impedance buffer circuit and said respective indication generation means, for converting the monitored communication signals to a signal level representative of the frequency thereof and wherein said respective indication generation means comprises comparator means for comparing said frequency representative signal level with respective levels associated with said prescribed frequency bands and generating an indication of one of said frequency bands in which detected communication signals are contained.

33. A telephone line test apparatus according to claim 29, further including third means, coupled to said second means, for controllably coupling operating power thereto for a prescribed period of time.

34. A telephone line test apparatus comprising:
first means, to which a telephone line is to be coupled, for providing an output representative of an electrical condition of said telephone line; and
second means, coupled to said first means, for generating an indication of the busy/idle condition of and the connection condition of a talk battery for said telephone line; and
wherein said second means comprises first and second display devices and means for controllably illuminating said first and second display devices to provide contemporaneously an indication of the busy/idle status of and the connection condition of a talk battery for said telephone line; and
further including third means, coupled to said second means, for controllably coupling operating power thereto for a prescribed period of time.

35. A telephone line test apparatus comprising:
first means, to which a telephone line is to be coupled, for providing an output representative of an electrical condition of said telephone line; and
second means, coupled to said first means, for generating an indication of the busy/idle condition of and the connection condition of a talk battery for said telephone line; and
wherein said second means comprises first and second display devices and means for controllably illuminating said first and second display devices to provide contemporaneously an indication of the busy/idle status of the connection condition of a talk battery for said telephone line; and
wherein said controllably illuminating means comprises means for controllably illuminating said first and second display devices in a steady-state or intermittent manner in accordance with the busy/idle condition of and the connection condition of a talk battery for said telephone line.

* * * * *